Figure 1:
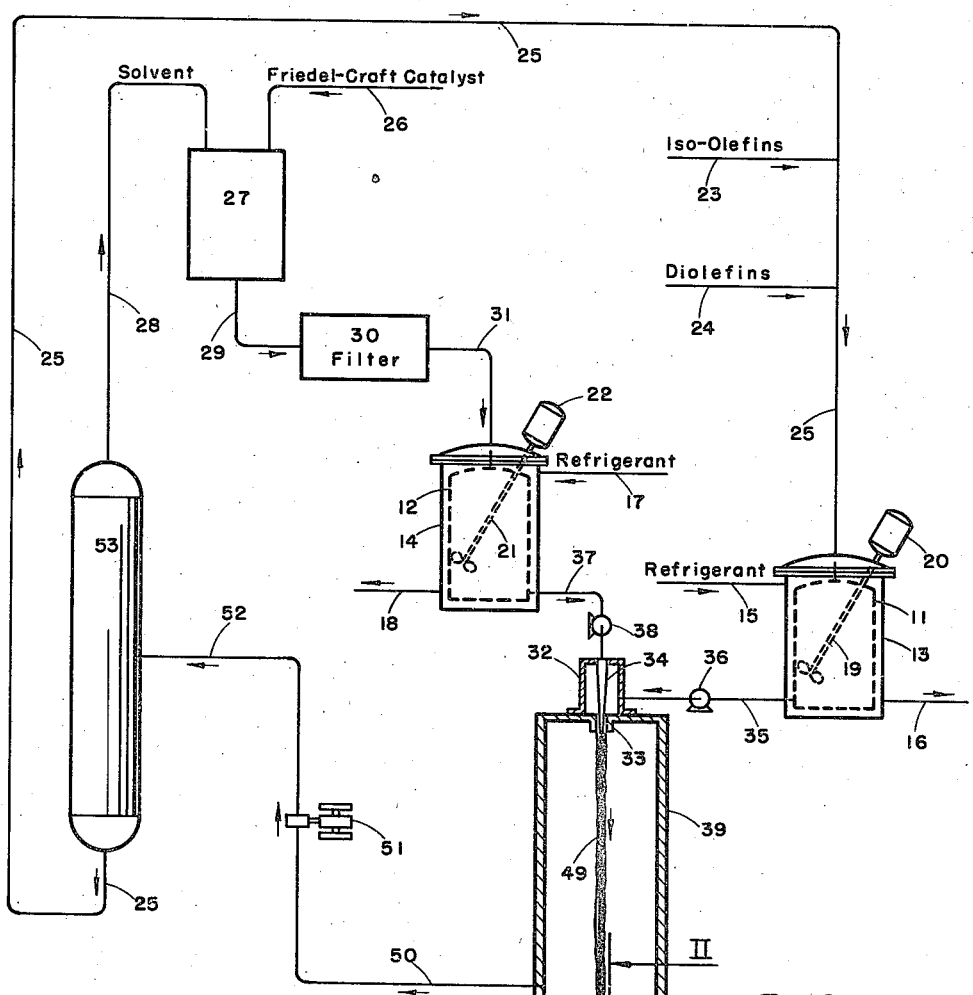

Aug. 6, 1946.     H. D. WILDE     2,405,480
POLYMERIZATION PROCESS
Filed Oct. 5, 1944

INVENTOR.
Henry D. Wilde
BY
J. D. McKean
ATTORNEY.

Patented Aug. 6, 1946

2,405,480

UNITED STATES PATENT OFFICE 2,405,480

POLYMERIZATION PROCESS

Henry D. Wilde, Houston, Tex., assignor to Standard Oil Development Company, a corporation of Delaware Application October 5, 1944, Serial No. 557,258

4 Claims. (Cl. 18—47.5)

The present invention is directed to a process for producing a vulcanizable polymer from olefinic material. More specifically the invention is directed to a continuous process wherein olefinic material and polymerization catalyst are mixed at low temperatures by a jetting nozzle system and the polymerization reaction allowed to take place in space and the resultant mixture then brought into contact with a heated surface to remove unreacted constituents therefrom and to heat the vulcanizable polymer and the heated polymer then extruded through an orifice.

The polymerization of olefinic material, such as iso-olefins, especially isobutylene, either alone or in admixture with a polyolefin, such as butadiene, isoprene, piperylene and the like, at low temperatures is well known to the art. This reaction may be carried out at temperatures ranging from $-10°$ C. to $-100°$ C., preferably within the temperature range of $-40°$ C. to $-80°$ C., and employs a Friedel-Crafts type catalyst, preferably in solution in a low-freezing, non-complex-forming solvent, aluminum chloride dissolved in methyl or ethyl chloride being particularly useful. A description of such a reaction conducted by jetting a stream of the polymerizable olefinic material into free space and jetting into the stream a second stream of liquid catalyst material is described in U. S. application Serial No. 491,028, filed June 16, 1943, in the name of Robert M. Thomas, Paul J. Flory and John D. Calfee. In application Serial No. 491,028 it is disclosed that the stream of polymer and incidental material resulting from the reaction may be collected in a pool of aqueous solution or alcohol, or alternatively the stream may be delivered against an unrefrigerated metal surface. As the polymerization process has heretofore been practiced on a commercial scale, the reactants have been collected in a pool of warm water or alcohol and form a slurry and the slurry is treated to recover the polymer therefrom.

The formation of such a slurry is a disadvantage in that it is necessary to go through an elaborate filtering and drying procedure in order to obtain the desired polymer, and in addition the unreacted constituents must be dried before they may be recycled to the process.

In accordance with the present application I propose to carry out the polymerization of olefinic material and recover the polymer and unreacted constituents without bringing them into contact with a quenching liquid. The polymer recovered in accordance with the present invention is in condition to be immediately extruded through an orifice without being subjected to intermediate manipulative steps.

In the present invention the resultant stream obtained by the contact of polymerizable olefinic material and catalyst, such as obtained in the process of U. S. Serial No. 491,028, is brought into contact with a heated surface under such conditions that the stream will spread out on the surface in a relatively thin sheet and the volatile constituents in the stream will be vaporized from the surface so that the desired polymerized product forms the major portion of the resulting sheet on the surface. The heated sheet of polymer is not only free from extraneous constituents, but is also in a condition for immediate extrusion and may be extruded in the form of small diameter rods suitable for milling and sheeting in a finishing mill, or alternatively may be extruded in the form of a continuous sheet which may be sent without further milling to cutting and packaging equipment.

In the preferred embodiment of the present invention a falling stream of polymer and volatile materials is brought into contact with a slowly rotating steam-heated drum. As the stream of slurry strikes the drum it spreads out into a relatively thin sheet and the unreacted hydrocarbons and diluent are evaporated therefrom, leaving a sheet of substantially pure vulcanizable polymer. As the sheet of polymer is carried to the under portion of the drum by rotation, it is removed from the drum to the extruder. Under some conditions the rubber may fall or be pulled from the drum by the feeding action of the extruder, but such action may be aided by a scraper to separate the polymer from the drum. It is usually desirable to maintain a film of anti-tack material, such as corn oil, castor oil or zinc stearate suspension, on the surface of the drum in order to prevent the polymer from sticking to the hot surface thereof.

Figure 2:
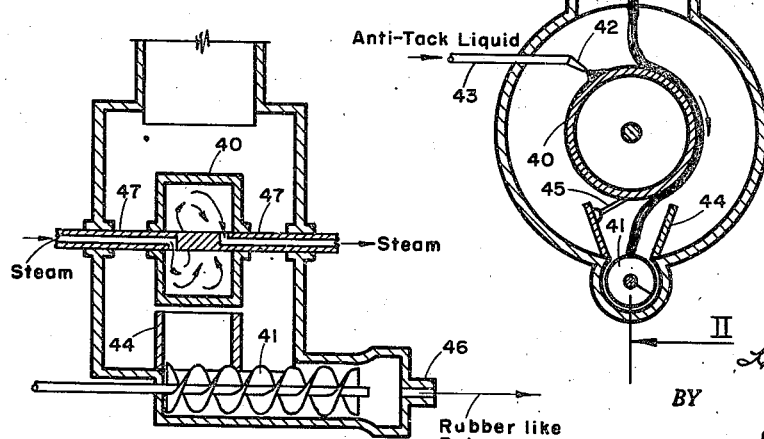

The invention will now be described in greater detail in conjunction with the drawing, in which:

Fig. 1 is the form of an elevation, partly in section, of apparatus suitable for the practice of the present invention; and Fig. 2 is a view taken along line II—II of Fig. 1.

Turning now specifically to the drawing, a mixture of polymerizable material is provided in vessel 11 and a catalytic agent is prepared in vessel 12. The polymerizable material and catalytic agent are chilled to a temperature in the range of $-10°$ C. to $-100°$ C. before admixture, and a suitable refrigerating arrangement for obtaining this chilling is indicated by refrigerating jacket 13 for vessel 11 and refrigerating jacket 14 for vessel 12. A refrigerant is supplied to jacket 13 by inlet 15 and is removed by outlet 16. Similarly a refrigerant is injected into the jacket 14 through inlet 17 and is removed through outlet 18. It is desirable to obtain thorough admixture of the polymerizable olefinic material and the catalytic agent respectively, and to this end vessel 11 is provided with a stirrer 19 operated by motor 20 and vessel 12 is provided by stirrer 21 operated by motor 22.

It is preferred to employ a mixture of iso-olefin and diolefin as the polymerizable olefinic material in vessel 11. The iso-olefin may be supplied by inlet 23 and the diolefin by inlet 24, with both inlets discharging into line 25, which in turn discharges into vessel 11.

The catalytic mixture employed in the reaction is preferably formed by dissolving or dispersing a Friedel-Crafts type catalyst in a non-freezing, non-complex-forming liquid solvent. The preferred catalyst is aluminum chloride and preferred solvents are ethyl or methyl chloride. The Friedel-Crafts type catalyst is discharged through inlet 26 into vessel 27 and solvent is discharged into vessel 27 by means of line 28. Vessel 27 serves as a dissolving vessel and catalyst solution may be withdrawn therefrom through line 29, passed through filter 30 to remove any solid lumps of catalyst from the solution and discharged by line 31 into refrigerated vessel 12.

The olefinic mixture and the catalyst are admixed by means of a jet structure. In the drawing the jet structure is indicated as constructed of a chamber 32 with its lower wall provided with an orifice 33. Within the chamber is a jet member 34 arranged with its lower end adjacent orifice 33. In the drawing the lower end of the jet member is indicated as projecting slightly below orifice 33, but it will be understood that the relative position of the lower end of the jet member and the orifice plate may be altered as desired and the end of the jet may sometimes be above the lower end of the orifice or may be adjusted to extend still farther below the orifice than is indicated in the drawing.

Olefinic material is withdrawn from refrigerated vessel 11 and passed into container 32 by line 35, containing pump 36. Catalytic solution is withdrawn from refrigerated vessel 12 and discharged into jet member 34 by the use of line 37, containing pump 38. The olefinic mixture flows from container 32 through the annulus defined by the orifice 33 and the outer wall of jet 34, while the catalytic mixture is forced through nozzle 34. The two streams are admixed under conditions to cause a high degree of turbulence and excellent mixing of the catalyst with the olefinic feed. The reaction between the olefinic materials and the catalyst solution takes place in a very short period of time and it is accordingly necessary to obtain thorough admixture of the two streams immediately upon bringing them into contact.

The pumps 36 and 38 are shown in the drawing to indicate means for regulating the pressure at which the olefinic material and the catalytic solution are discharged into the jet member. It will be understood that other pressure-producing means may be employed if desired; for example, gas pressure may be imposed on the liquid in vessels 11 and 12 to obtain equivalent results. The pressure to be imposed on the olefinic feed stock and catalytic mixture may be varied as desired. For example, the olefinic material may be discharged under atmospheric pressure without increasing the pressure thereof with pump 36, while the catalytic material may be discharged into the jet nozzle under a high pressure, or a high pressure may be imposed on both the olefinic material and the catalytic material, or optionally a high pressure may be imposed on the olefinic material and a low pressure on the catalytic material. It will be understood that the employment of the olefinic and catalytic mixtures for the reaction and the use of a jet type reactor is well known to the art and is described in detail in Serial No. 491,028.

The jet member is mounted on a relatively large chamber 39, which is provided with a rotating drum 40 and extruder screw 41. A spray nozzle 42 is mounted adjacent drum 40 and is provided with an inlet 43, which supplies anti-tack liquid to the spray nozzle to be sprayed on the surface of the drum. The lower end of container 39 defines a passage in which the extruder screw is positioned. A hopper 44 is arranged for directing solids from the drum into the passage and a knife blade or doctor 45 is provided for removing solids from the drum into the extruder passage. The outer end of the extruder passage terminates in an opening or orifice 46.

Drum 40 is provided with a suitable arrangement for heating it to a temperature substantially above atmospheric. Such an arrangement is illustrated diagrammatically in the drawing, in which the drum is mounted on axis 47, which is in the form of a tubular member defining an inlet by which steam may be injected into the drum and an outlet by which the steam may be removed from the drum. This arrangement allows the drum to be rotated by suitable prime mover, not shown, while its surface is maintained in a heated condition by the heating medium.

It is preferred to maintain the drum 40 at a temperature in the range of 100° to 200° C. The most satisfactory way of obtaining such a temperature is by the use of super-heated steam which may be discharged into the drum as a heating medium and withdrawn therefrom without the accumulation of condensate within the drum. The employment of this temperature range not only insures the thorough de-gassing of the polymer deposited on the surface of the drum, but in addition adjusts the temperature of the polymer so that it is in condition for immediate extruding or kneading and extruding operations, as desired.

A suitable anti-tack material for coating the surface of drum 40 is corn oil, castor oil or zinc stearate suspension. The anti-tack liquid is sprayed on the heated surface of the drum by means of spray 42 and forms a film thereon before the drum comes in contact with the polymer stream 49 and prevents or reduces the sticking of the polymer to the hot surface of the drum.

Gases released within container 39 may be removed through line 50, passed through compressor 51 and discharged through line 52 to distillation column 53. In the distillation column the vapors may be separated in accordance with their boiling points. If methyl chloride is employed as the diluent and isobutylene and butadiene as the reactants, the diluent will have a somewhat lower boiling point than the unreacted hydrocarbons and may be removed as overhead from column 53 and recycled through line 28 to vessel 27. The mixture of iso-olefin and diolefin may be withdrawn from a lower portion of fractionating column 53 via line 25 and returned to refrigerated vessel 11. It will be understood that fractionating column 53 is illustrated diagrammatically, and in actual practice several columns will usually be empoyed, and in addition, if desired, the several constituents may be separated one from another and undesired materials discarded from the system. Such an operation of fractional distillation is well known to the art and for this reason is not shown in detail in the drawing.

The reaction between the olefinic material and catalytic solution which are admixed by the jet mixer takes place in a very short interval of time and within a short distance of the nozzle. The product of the polymerization is a rubber-like polymer, while the solvent and the unreacted feed stock have low boiling points. As a considerable heat of reaction is liberated during the polymerization, a substantial portion of the solvent and unreacted feed stock is vaporized from the freely falling stream. The resulting stream accordingly consists of a substantial portion of solid polymer associated with liquid. This stream is indicated on the drawing by numeral 49. The stream 49 is allowed to fall on rotating steam-heated drum 40, and upon striking the drum the stream of slurry spreads out into a relatively thin sheet and the volatile materials which have not heretofore been vaporized from the heavier constituents by the heat of reaction are vaporized by contact with the heated surface of the drum. The vapors released from the stream 49 as it falls through space as well as from the sheet on drum 40 are withdrawn from container 39 through vapor line 50 and returned to the system by lines 28 and 25, as previously described. As the sheet of polymer is carried by the rotation of the drum to a point adjacent extruder screw 41 it is removed by knife 45 and falls into hopper 44, where it is brought into contact with extruder screw 41. The heating of the polymer on the drum in order to drive off volatile materials has brought the polymer to a temperature range suitable for extrusion, and the rubber-like material removed from drum 40 is accordingly worked by extrusion screw 41 and forced out through orifice plate 46. The rubber-like polymer is withdrawn continuously from the system by the operation of extruder screw 41 and forms a continuous seal at orifice 46 to prevent the loss of the vaporized unreacted feed and solvent at this point.

It will be understood that although a single jet reactor has been shown in the drawing, the invention is by no means limited to the use of a single reactor in connection with a heated surface. When producing a large amount of vulcanizable polymer it is desirable to employ a relatively elongated rotating drum and arrange a series of jet nozzles in a line parallel to the axis of the drum so that the product from the series of jet nozzles spreads the resulting polymer over the surface thereof. It will also be understood that the invention is not limited to the type of extruder shown in the drawing, but other types may be employed; for example, the material withdrawn from drum 40 may be first sent to a kneader of the type described and illustrated in co-pending application No. 386,967, filed December 7, 1940, in the name of M. R. Mann, Jr., and the kneaded material then discharged into an extruder.

It will be understood that while I have disclosed a specific embodiment of the present invention, the practice of the invention is not restricted to the specific embodiment. For example, although I have shown the axis of the rotating drum as horizontal, it is not necessary to construct the moving heated surface in this manner. Under some circumstances it may be found desirable to discharge the stream on a plane surface maintained in a suitably heated condition and to remove the polymer from the plane surface to an extruder means. Accordingly, my invention may be described broadly as involving the reaction of an olefinic feed with a Friedel-Crafts type catalyst in a freely falling stream, the discharge of the stream on a heated surface in such a manner as to form a sheet on the surface and the removal of the sheet of polymer from the heated surface and the extrusion thereof.

Having fully described and illustrated the practice of the present invention, what I desire to claim is:

1. In a polymerization process wherein polymerizable olefinic material is reacted at a temperature substantially below atmospheric to produce vulcanizable polymer in the presence of a Friedel-Crafts type catalyst as a chilled stream projected into space, the steps of forming said stream into a sheet after a substantial portion of the olefinic material has reacted to form vulcanizable polymer and heating the resulting sheet to a temperature in the range of 100° to 200° C. to remove readily vaporizable constituents therefrom and produce a sheet comprising a major portion of vulcanizable polymer and subsequently extruding the hot sheet through an orifice.

2. In a polymerization process wherein a chilled stream projected into space is formed by jetting together polymerizable olefinic material at a temperature substantially below atmospheric and a Friedel-Crafts type catalyst at a temperature substantially below atmospheric and polymerization takes place in the chilled stream at a temperature substantially below atmospheric as it is projected into space, the steps of bringing the stream at a temperature substantially below atmospheric into contact with a heated surface after a substantial portion of the olefinic material has reacted to form vulcanizable polymer, causing the stream to spread as a sheet on the surface and heating the sheet by contact with the surface to a temperature in the range of 100° to 200° C. to remove readily vaporizable constituents therefrom, removing the resultant hot sheet from the surface and extruding it through an orifice.

3. A process for obtaining a vulcanizable polymer comprising the steps of jetting together a stream of polymerizable olefinic material at a temperature substantially below atmospheric and a stream of solution of a Friedel-Crafts type catalyst at a temperature substantially below atmospheric to form a resultant stream projected into space at a temperature substantially below atmospheric under conditions of high turbulence to cause polymerization to occur therein at a rapid rate, projecting the stream at a temperature substantially below atmospheric on a surface after a substantial portion of the olefinic material has reacted to form vulcanizable polymer and spreading the stream as a sheet on the surface, heating the sheet by indirect heat exchange to a temperature in the range of 100° to 200° C. to evaporate low boiling constituents from the sheet, removing the hot sheet from the surface and extruding it through an orifice without a substantial reduction in temperature thereof.

4. A polymerization process comprising the steps of jetting together a stream of polymerizable olefinic material at a temperature substantially below atmospheric and a stream of liquid catalyst material at a temperature substantially below atmospheric including a Friedel-Crafts type catalyst to form a resultant stream at a temperature substantially below atmospheric and under conditions of high turbulence to cause the rapid polymerization of a substantial portion of the olefinic material to form vulcanizable polymer, projecting said resultant stream at a temperature substantially below atmospheric first through free space and then upon the surface of a continuously rotating drum, maintaining the surface of the drum at a temperature in the range of 100° to 200° C. and causing the stream to spread on the drum to form a relatively thin sheet, maintaining the sheet in contact with the surface of the drum until the temperature of the sheet approaches that of the drum and low boiling constituents are evaporated from the sheet, and removing the hot sheet from the surface of the drum and extruding it through an orifice without substantially reducing the temperature thereof.

HENRY D. WILDE.